(12) United States Patent
Kaneko

(10) Patent No.: US 7,620,488 B2
(45) Date of Patent: Nov. 17, 2009

(54) ENGINE CONTROL APPARATUS

(75) Inventor: Naoya Kaneko, Susono-shi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 58 days.

(21) Appl. No.: 11/990,521

(22) PCT Filed: Aug. 22, 2006

(86) PCT No.: PCT/IB2006/002281

§ 371 (c)(1),
(2), (4) Date: Feb. 15, 2008

(87) PCT Pub. No.: WO2007/023357

PCT Pub. Date: Mar. 1, 2007

(65) Prior Publication Data
US 2009/0099753 A1 Apr. 16, 2009

(30) Foreign Application Priority Data
Aug. 23, 2005 (JP) ............... 2005-241503

(51) Int. Cl.
F02M 63/00 (2006.01)
G06F 19/00 (2006.01)

(52) U.S. Cl. .................. 701/103; 123/299; 123/672

(58) Field of Classification Search ......... 701/103–105; 123/299, 300, 672, 674, 698, 478, 480
See application file for complete search history.

(56) References Cited

U.S. PATENT DOCUMENTS

| 4,383,515 | A | * | 5/1983 | Higashiyama et al. ...... 123/480 |
| 4,461,258 | A | | 7/1984 | Becker et al. |
| 4,911,131 | A | * | 3/1990 | Nakaniwa et al. ........... 123/478 |
| 5,727,537 | A | * | 3/1998 | Nakagawa et al. .......... 123/698 |
| 6,360,733 | B1 | * | 3/2002 | Uberti Bona Blotto et al. ................. 123/674 |
| 6,988,490 | B2 | * | 1/2006 | Satou .......................... 701/103 |
| 7,050,901 | B2 | * | 5/2006 | Yasuda et al. ............... 701/113 |
| 2003/0164166 | A1 | | 9/2003 | Takeuchi et al. |
| 2004/0031472 | A1 | | 2/2004 | Nagano et al. |
| 2005/0022797 | A1 | | 2/2005 | Ikemoto et al. |
| 2005/0066939 | A1 | | 3/2005 | Shimada et al. |
| 2005/0178360 | A1 | | 8/2005 | Satou |

FOREIGN PATENT DOCUMENTS

EP    1 533 507 A2    5/2005

(Continued)

Primary Examiner—Hieu T Vo
(74) Attorney, Agent, or Firm—Oliff & Berridge, PLC

(57) ABSTRACT

A control apparatus of an engine that includes an intake passage fuel injector and an in-cylinder fuel injector according to the invention is characterized by further including correcting means for selectively increase-correcting or decrease-correcting a fuel injection quantity to bring an air-fuel ratio close to a predetermined target air-fuel ratio; and switching means for dividing an increase amount or decrease amount of the fuel injection quantity into a distribution ratio that is to be divided between the two fuel injectors, and when executing a correction by the correcting means, making one of the fuel injectors responsible for the larger part of a ratio, making the other fuel injector responsible for the smaller part of the ratio, and switching the fuel injector responsible fore the larger part of the ratio according to the operating state of the engine.

6 Claims, 8 Drawing Sheets

FOREIGN PATENT DOCUMENTS

| | | |
|---|---|---|
| JP | A-04-279743 | 10/1992 |
| JP | A-06-288286 | 10/1994 |
| JP | A-2000-205020 | 7/2000 |
| JP | A-2001-020837 | 1/2001 |
| JP | A-2004-060474 | 2/2004 |
| JP | A-2005-171822 | 6/2005 |
| WO | WO 2006/022274 | 3/2006 |

* cited by examiner

FIG. 7
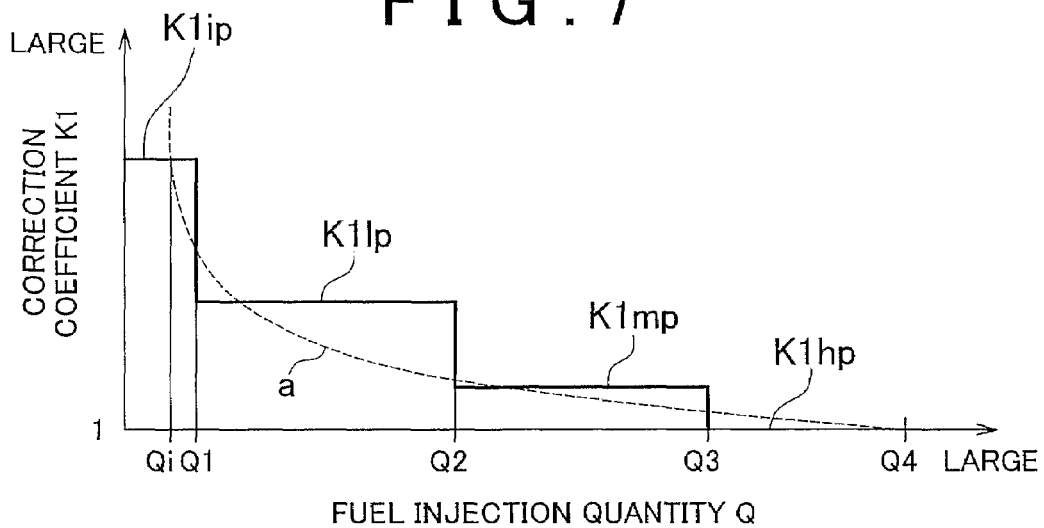
FIG. 8
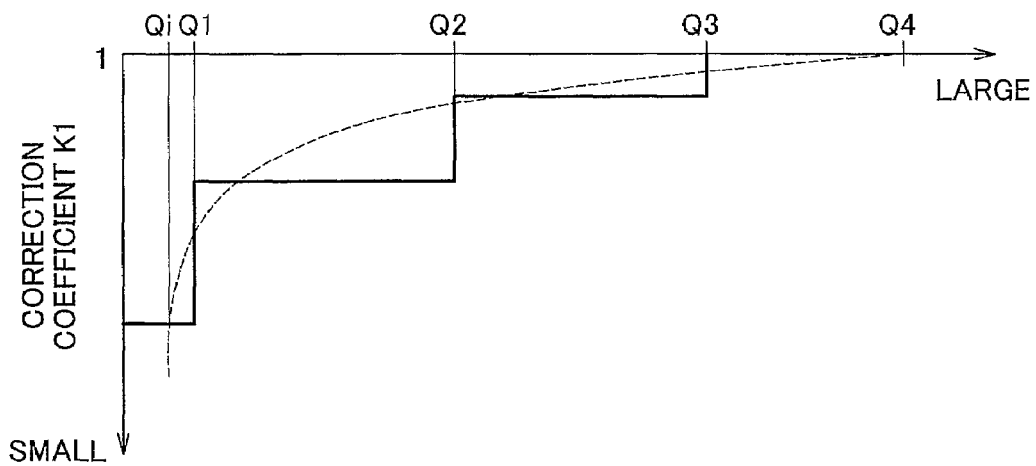
FIG. 9
| REGION | IDLING | LOW LOAD | MEDIUM LOAD | HIGH LOAD |
|---|---|---|---|---|
| CORRECTION COEFFICIENT K1 | K1id1 | K1ld1 | K1md1 | 1 |

FIG. 10

|    | IDLING | LOW LOAD | MEDIUM LOAD | HIGH LOAD |
|----|--------|----------|-------------|-----------|
| P1 | K1id1  | K1ld1    | K1md1       | 1         |
| P2 | K1id2  | K1ld2    | K1md2       | 1         |
| P3 | K1id3  | K1ld3    | K1md3       | 1         |
| P4 | K1id4  | K1ld4    | K1md4       | 1         |

FIG. 11

|    | IDLING   | LOW LOAD | MEDIUM LOAD | HIGH LOAD |
|----|----------|----------|-------------|-----------|
| P1 | LEARNING | LEARNING | LEARNING    | 1         |
| P2 | LEARNING | LEARNING | LEARNING    | 1         |
| P3 | LEARNING | LEARNING | LEARNING    | 1         |
| P4 | LEARNING | LEARNING | LEARNING    | 1         |

FIG. 12

|    | IDLING   | LOW LOAD | MEDIUM LOAD | HIGH LOAD |
|----|----------|----------|-------------|-----------|
| P1 | LEARNING |          |             | 1         |
| P2 |          | LEARNING |             | 1         |
| P3 |          |          | LEARNING    | 1         |
| P4 |          |          |             | 1         |

FIG. 13

|    | IDLING   | LOW LOAD | MEDIUM LOAD | HIGH LOAD |
|----|----------|----------|-------------|-----------|
| P1 | LEARNING |          |             | 1         |
| P2 |          |          |             | 1         |
| P3 |          |          |             | 1         |
| P4 |          |          |             | 1         |

ENGINE CONTROL APPARATUS

BACKGROUND OF THE INVENTION

1. Field of the Invention

The invention relates to a control apparatus of an engine, and more particularly, to a control apparatus of an engine capable of executing both an intake passage fuel injection and an in-cylinder fuel injection.

2. Description of the Related Art

So-called dual fuel injector engines are known which are provided with an intake passage fuel injector for injecting fuel into an intake passage, and an in-cylinder fuel injector for injecting fuel into a cylinder. It is also well known that in this kind of dual fuel injector engine the total injection quantity during one injection cycle is divided between the two injectors and the distribution ratio of that fuel injection quantity is changed according to the operating state of the engine. Technology related to this is described in Japanese Patent Application Publication No. JP-A-2001-20837, for example.

When executing air-fuel ratio control to bring the air-fuel ratio close to a predetermined target air-fuel ratio, it is desirable to make appropriate corrections that take into account combustion characteristics and the like determined by the operating state of the engine. Otherwise, even if a fuel injection quantity is corrected, the air-fuel ratio may conversely become even farther away from the target air-fuel ratio. Also, it is preferable that the air-fuel ratios in all of the cylinders match the target air-fuel ratio, though in actuality there is some degree of variation between cylinders. This variation is caused by individual differences due to, for example, injector manufacturing errors. Moreover, when the injection is divided up, the number of injectors that inject fuel increases while the injection quantity per injector decreases. As a result, the air-fuel ratio deviates even farther from the target air-fuel ratio, which is undesirable for performing accurate air-fuel ratio control.

DISCLOSURE OF THE INVENTION

In view of the foregoing problems, a first aspect of the invention relates to a control apparatus of an engine provided with an intake passage fuel injector for executing an intake passage fuel injection, and an in-cylinder fuel injector for executing an in-cylinder fuel injection, characterised by including correcting means for selectively increase-correcting or decrease-correcting a fuel injection quantity to bring an air-fuel ratio close to a predetermined target air-fuel ratio, and switching means for dividing an increase amount or decrease amount of the fuel injection quantity into a distribution ratio that is to be divided between the two fuel injectors, and when executing a correction by the correcting means, making one of the fuel injectors responsible for the larger part of the ratio, making the other fuel injector responsible for the smaller part of the ratio, and switching the fuel injector responsible for the larger part of the ratio according to the operating state of the engine.

According to this first aspect of the invention, the switching means switches the fuel injector responsible for the larger part of the ratio of the increase amount or the decrease amount of the fuel injection quantity when the fuel injection quantity is corrected according to air-fuel ratio control. As a result, an appropriate correction which takes into account the combustion characteristics and the like determined by the operating state of the engine is able to be performed such that the fuel injection quantity correction can be performed in an appropriate manner.

In the foregoing structure, the switching means may switch the fuel injector when the engine is operating in a predetermined distributed injection region.

Also in the foregoing structure, when the engine is operating in a state in which homogeneity of an air-fuel mixture in a cylinder is required, the switching means may make the intake passage fuel injector the injector responsible for the larger part of the ratio during an increase-correction and make the in-cylinder fuel injector the injector responsible for the larger part of the ratio during a decrease-correction.

Further in the foregoing structure, when the engine is operating in a state in which a rise in temperature of a tip of the in-cylinder fuel injector needs to be suppressed, the switching means may make the in-cylinder fuel injector the injector responsible for the larger part of the ratio during an increase-correction and make the intake passage fuel injector the injector responsible for the larger part of the ratio during a decrease-correction.

Also, a second aspect of the invention relates to a control apparatus of an engine provided with an intake passage fuel injector for executing an intake passage fuel injection and an in-cylinder fuel injector for executing an in-cylinder fuel injection for each cylinder, characterised by including learning means for changing the fuel injection quantity of the intake passage fuel injector or the in-cylinder fuel injector of each cylinder such that the air-fuel ratio of each cylinder matches a predetermined target air-fuel ratio during steady operation on a low load side of the engine, and learning a predetermined correction coefficient for each cylinder when the air-fuel ratio matches the predetermined target air-fuel ratio.

According to this second aspect of the invention, an optimum correction coefficient so that the air-fuel ratio will not deviate from the target air-fuel ratio can be learned. As a result, it is possible to suppress variations in the air-fuel ratios or fuel injection quantities among cylinders or fuel injectors, and thus increase the accuracy of air-fuel ratio control.

Here, in the foregoing structure, the learning means may learn the correction coefficients when the engine is idling, set a learned value of the correction coefficient for each cylinder that was obtained through that learning as a correction coefficient of an idling region, and interpolate the correction coefficient of a load region between the idling region and a high load region based on the correction coefficient of the idling region and a predetermined correction coefficient of the high load region.

Accordingly, learning is only performed while the engine is idling which enables it to be much simpler and the learning time drastically shortened compared to when learning is performed for the all of load regions.

Also, in the foregoing structure, when learning the correction coefficients for the in-cylinder fuel injector, the learning means may learn those correction coefficients for each of a plurality of fuel pressures.

During an in-cylinder fuel injection, the fuel pressure may also cause variation in the air-fuel ratios so performing learning with respect to each of a plurality of fuel pressures in this way enables air-fuel ratio control to be more accurate over a wider range.

Thus, the invention displays the excellent effects of enabling a fuel injection quantity correction to be performed in an appropriate manner during air-fuel ratio control, as well as the accuracy of the air-fuel ratio control to be improved.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 7 is a graph related to the setting of a correction coefficient K1 when there is a deviation toward the lean side;

FIG. 8 is a is a graph related to the setting of the correction coefficient K1 when there is a deviation toward the rich side;

FIG. 9 is a chart showing the correction coefficient in each region for an intake passage fuel injector;

FIG. 10 is a chart showing the correction coefficient in each region for an in-cylinder fuel injector;

FIG. 11 is a chart showing another mode related to the setting of the correction coefficient for the in-cylinder fuel injector;

FIG. 12 is a chart showing yet another mode related to the setting of the correction coefficient for the in-cylinder fuel injector; and FIG. 13 is a chart showing still another mode related to the setting of the correction coefficient for the in-cylinder fuel injector.

DETAILED DESCRIPTION OF THE PREFERRED EMBODIMENTS

In the following description and the accompanying drawings, the present invention will be described in more detail in terms of exemplary embodiments.

Figure 1:
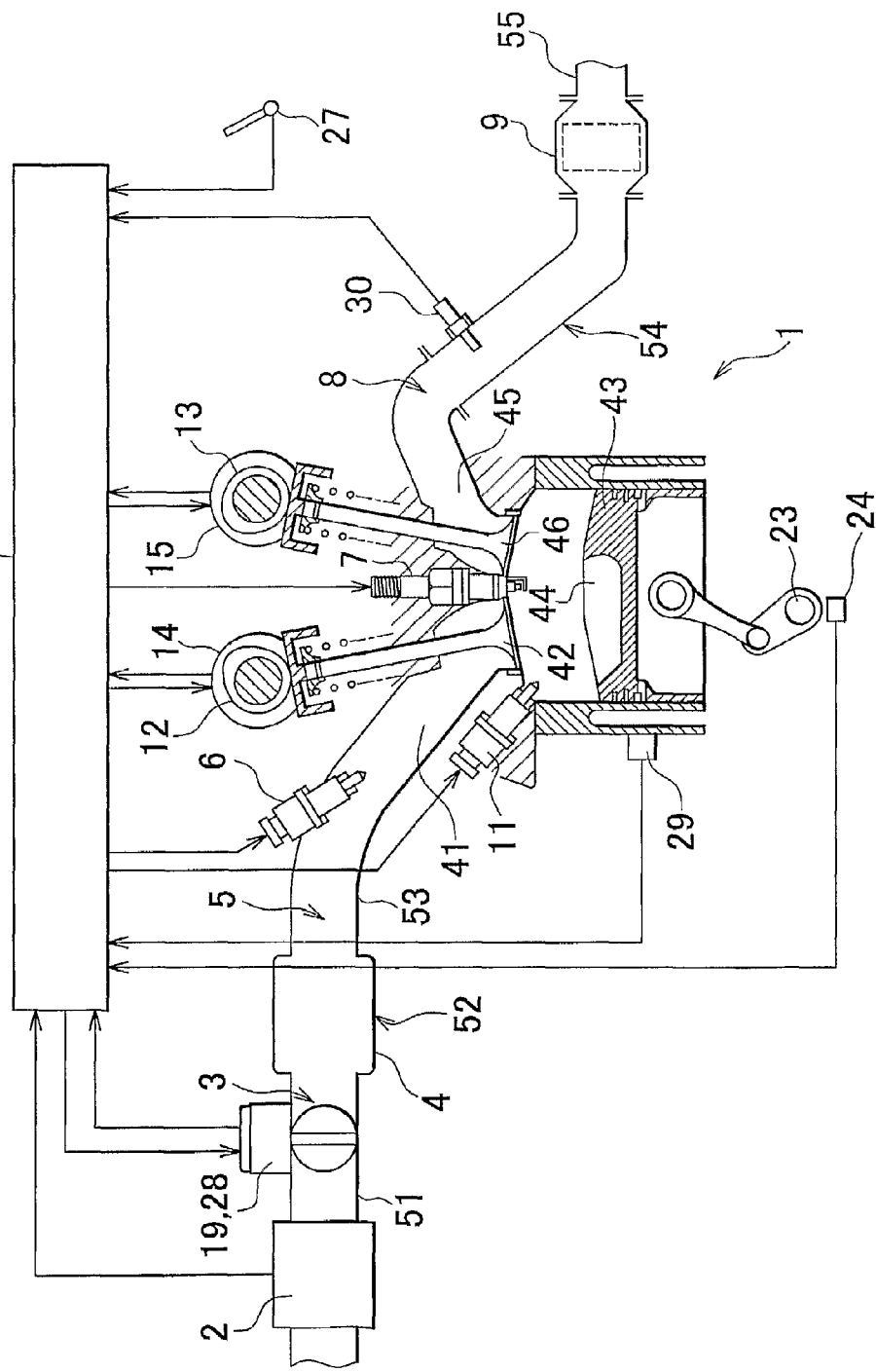
FIG. 1 is a system plan view of a control apparatus for an engine according to one example embodiment of the invention.

FIG. 1 shows a control system of an engine according to one example embodiment of the invention. The engine 1 shown in the drawing is a so-called dual fuel injector engine. In this example embodiment, the engine has four cylinders 4 (only one cylinder is shown in the drawing), though the number of cylinders is not particularly limited. An in-cylinder fuel injector 11 and an intake passage fuel injector 6 are provided for each cylinder. In this example embodiment, the engine 1 uses gasoline as fuel, though alcohol or a mixed fuel of alcohol and gasoline, a gas fuel such as CNG, or other fuel may also be used.

Air drawn in from an air cleaner, not shown, is distributed to the combustion chambers of the cylinders via an intake passage 5. The intake passage 5 is defined by an intake pipe 51, an intake manifold 52, and an intake port 41 in that order from the upstream side. The intake manifold 52 includes a surge tank 4 which serves as a collecting portion located on the upstream side and branch pipes 53 to the cylinders, one branch pipe 53 connecting to the intake port 41 of each cylinder. The intake pipe 51 is provided with an airflow meter 2 and an electronically controlled throttle valve 3. One intake passage fuel injector 6 is provided in the intake passage 5 of each cylinder, arranged specifically to inject fuel toward the outlet portion of the intake port 41 for each cylinder. The fuel injected from the intake passage fuel injector 6 mixes with air to form a relatively homogeneous air-fuel mixture in the combustion chamber in the cylinder. The intake passage fuel injector 6 injects fuel by opening in response to an on signal output from an electronic control unit (hereinafter simply referred to as "ECU") 100 that serves as controlling means, and stops injecting fuel by closing in response to an off signal output from the ECU 100. The injection of this intake passage fuel injection is set either to occur before the opening timing of an intake valve 42 that opens and closes the outlet of the intake port 4, or at least partially overlap with the opening timing of the intake valve 42.

Figure 2:
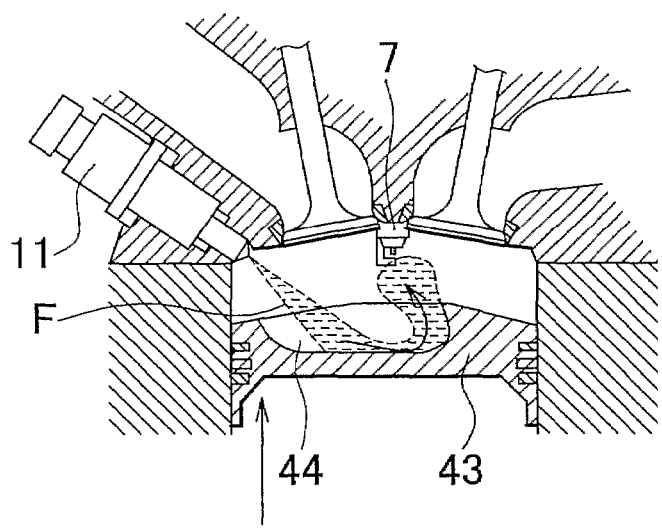
FIG. 2 is a sectional view showing an in-cylinder fuel injection being performed during the compression stroke.

Meanwhile, one electromagnetic in-cylinder fuel injector 11 is provided for each cylinder to inject fuel directly into the combustion chamber of that cylinder. The in-cylinder fuel injector 11 in this example embodiment performs a fuel injection on one or both of the intake stroke and the compression stroke. With a fuel injection during the compression stroke, as shown in FIG. 2, fuel F is injected toward a concave portion 44 at the top portion of the piston 43 that is rising in the cylinder. The fuel and air mix in a process that creates a tumble-like flow which rolls up along the inside surface of the concave portion 44, and create a relatively rich air-fuel mixture layer near a spark plug 7. Also, although not shown, with a fuel injection during the intake stroke, a relatively homogeneous air-fuel mixture is also formed in the combustion chamber of the cylinder, similar to when the intake passage fuel injection is performed. Similar to the intake passage fuel injector 6, the in-cylinder fuel injector 11 also injects fuel by opening in response to an on signal output from the ECU 100 and stops injecting fuel by closing in response to an off signal output from the ECU 100.

The air-fuel mixture formed in the combustion chamber by one or both of the two fuel injection modes (i.e., the intake passage fuel injection and the in-cylinder fuel injection) is ignited by the spark plug 7 in response to an ignition signal from the ECU 100. As a result, the air-fuel mixture burns. The exhaust gas from the engine 1 is then exhausted through an exhaust passage 8. The exhaust passage 8 is defined by an exhaust port 45 formed for each cylinder in a cylinder head of the engine 1, an exhaust manifold 54 which is connected to these exhaust ports 45, a catalyst 9 for purifying the exhaust gas which is connected to the downstream side of the exhaust manifold 54, and an exhaust pipe 55 that is connected to the downstream side of the catalyst 9. An exhaust valve 46 is used to open and close the inlet of the exhaust port 45. The exhaust manifold 54 includes branch pipes for the cylinders, one branch pipe being connected to the exhaust port 45 of each cylinder, and a collecting portion located on the downstream side of the branch pipes.

Fuel from a fuel tank is supplied via a fuel supply system, not shown, to each intake passage fuel injector 6 and in-cylinder fuel injector 11. High pressure fuel is supplied to the in-cylinder fuel injector 11 by a high-pressure fuel pump. The injection pressure of the fuel supplied for the in-cylinder fuel injection is higher than the injection pressure of the fuel supplied for the intake passage fuel injection. Although not shown in the drawing, high-pressure fuel is supplied to each cylinder from a delivery pipe which is a common fuel chamber. The pressure (either fuel pressure or injection pressure) of this high-pressure fuel is detected by a fuel pressure sensor.

The intake valve 42 and exhaust valve 46 are driven open and closed by an intake valve camshaft 12 and an exhaust valve camshaft 13, respectively. In order to make the opening and closing timings of the intake valve 42 and the exhaust valve 46 variable, variable valve timing mechanisms 14 and 15 are appropriately provided on the intake valve camshaft 12 and the exhaust valve camshaft 13, respectively. These variable valve timing mechanisms 14 and 15 advance or retard the intake valve camshaft 12 and the exhaust valve camshaft 13 with respect to a crankshaft 23 in response to control signals from the ECU 100.

The ECU 100 includes a microcomputer that has a CPU, ROM, RAM, an A/D converter, and an input/output interface and the like. The ECU 100 receives input signals from various types of sensors, performs predetermined processing based on those input signals, and controls the in-cylinder fuel injector 11, the intake passage fuel injector 6, the spark plug 7, and a control motor 19 of the throttle valve 3, and the like.

The airflow meter 2 described above is included in the various sensors. This airflow meter 2 outputs a signal indicative of the flowrate of intake air passing through it to the ECU 100. The ECU 100 then calculates the load ratio on the engine based on the output value of the airflow meter 2. A crank sensor 24 that detects the angle of the crankshaft 23 is also included in the various sensors. The crank sensor 24 outputs a pulse signal at predetermined crank angle intervals. The ECU 100 detects the actual crank angle of the engine 1 based on this pulse signal and from it calculates the engine speed.

Also included in the various sensors are an accelerator opening amount sensor 27 that detects a depression amount of an accelerator pedal (i.e., accelerator opening amount), a throttle position sensor 28 that detects an opening amount of the throttle valve 3 (i.e., throttle opening amount), a coolant temperature sensor 29 that detects the coolant temperature of the engine 1 (hereinafter simply referred to as "engine coolant temperature"), and an air-fuel ratio sensor 30 that detects the oxygen concentration in the exhaust gas.

The ECU 100 controls the opening amount of the throttle valve 3. That is, the ECU 100 normally controls the drive motor 19 so that the output value of the throttle position sensor 28 matches a value corresponding to the output value of the accelerator opening amount sensor 27, thereby operatively linking the throttle opening amount to the accelerator opening amount.

In this example embodiment, means for detecting the air-fuel ratio in each cylinder is provided. That is, an air-fuel ratio sensor 30 is provided in the branch pipe of the exhaust manifold 54 of each cylinder. These air-fuel ratio sensors 30 detect the air-fuel ratios in each cylinder such that appropriate air-fuel ratio control can be performed for each cylinder. Alternatively, however, a single common air-fuel ratio sensor may be provided for all of the cylinders and the air-fuel ratio of each cylinder detected using output fluctuations of the sensor.

Next, engine control according to this example embodiment will be described.

The ECU 100 calculates a base fuel injection quantity Q0 referencing a predetermined map that was stored in advance, based on the detected operating state of the engine (i.e., the engine speed and load ratio in this example embodiment). Also, the ECU 100 similarly calculates the injection timing and ignition timing referencing predetermined maps stored in advance, based on the detected engine speed and load ratio. When an in-cylinder fuel injection is performed, the ECU 100 calculates a target fuel pressure referencing a predetermined map stored in advance, based on the detected engine speed and load ratio, and feedback-controls the fuel pressure so that the detected fuel pressure approaches the target fuel pressure.

Also, in this example embodiment, correcting means is provided for increase or decrease correcting the fuel injection quantity so that the detected air-fuel ratio approaches a predetermined target air-fuel ratio. In this example embodiment, the correcting means is formed by the ECU 100, which performs feedback control on the fuel injection quantity so that the detected air-fuel ratio λ comes to match a target air-fuel ratio 2λ in each cylinder.

Moreover, in this example embodiment, the total fuel injection quantity that is injected during one injection cycle in one cylinder is divided between the intake passage fuel injector 6 and the in-cylinder fuel injector 11 according to a predetermined distribution ratio α. The ECU 100 sets the fuel quantity to be injected from the intake passage fuel injector 6 (hereinafter referred to as "intake passage fuel injection quantity" as appropriate) and the fuel quantity to be injected from the in-cylinder fuel injector 11 (hereinafter referred to as "in-cylinder fuel injection quantity" as appropriate) according to the distribution ratio α. The fuel injectors 6 and 11 are then controlled on and off according to these fuel quantities. The distribution ratio α refers to the ratio of the in-cylinder fuel injection quantity to the total fuel injection quantity and has a value of 0 to 1, inclusive. When the total fuel injection quantity is Qt, then the in-cylinder fuel injection quantity Qd is expressed by α×Qt and the intake passage fuel injection quantity Qp is expressed by (1−α)×Qt.

The ECU 100 calculates the fuel injection quantity Qt to be injected during one injection cycle in one cylinder based on the following expression.

$$Qt = Q0 \times K1 \times K2 \quad (1)$$

Here, Q0 is the base fuel injection quantity obtained from the map described above. K1 is a correction coefficient related to variation or individual differences among the fuel injectors and is a value close to 1, as will be described in detail later. K2 is an air-fuel ratio feedback correction coefficient. When the actual detected air-fuel ratio λ is equal to the target air-fuel ratio 2λ, the value of K2 is 1. The value of K2 becomes greater than 1 the more the actual air-fuel ratio λ exceeds the target air-fuel ratio 2λ (i.e., the farther the actual air-fuel ratio is off to the lean side), and conversely becomes less than 1 the farther the actual air-fuel ratio λ is below the target air-fuel ratio 2λ (i.e., farther the actual air-fuel ratio is off to the rich side). A correction based on the coolant temperature, the intake air temperature, the battery voltage, and the like can also be added. From Expression (1), the in-cylinder fuel injection quantity Qd and the intake passage fuel injection quantity Qp can be expressed as follows.

$$Qd = \alpha \times Q0 \times K1 \times K2 \quad (2)$$

$$Qp = (1-\alpha) \times Q0 \times K1 \times K2 \quad (3)$$

Figure 3:
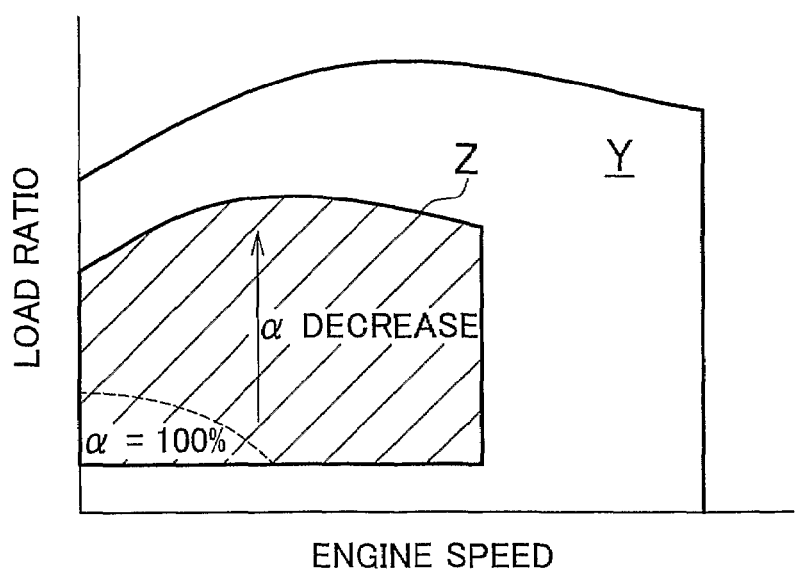
FIG. 3 is a graph showing the total operating range of the engine and the homogeneous lean burn region.

With the engine in this example embodiment, in the entire operating range of the engine, the low to medium load and low to medium speed region where hunting occurs (i.e., the so-called regularly used region) is set as the homogeneous lean burn region Z, as shown in FIG. 3. In this homogeneous lean burn region Z, homogeneous combustion is executed according to one or both of the intake passage fuel injection and the in-cylinder fuel injection during the intake stroke, and the target air-fuel ratio is set to a value that is much leaner than the stoichiometric air-fuel ratio. In region Y outside the homogeneous lean burn region Z, the target air-fuel ratio is set to either the stoichiometric air-fuel ratio or a value that is richer than the stoichiometric air-fuel ratio. The fuel injection mode includes an in-cylinder fuel injection during the compression stroke in order to achieve stratified-charged combustion or semi-stratified charged combustion.

In the homogeneous lean burn range Z except for on the low load side that is below the broken line in the graph, a distributed injection is performed. A distributed injection in this specification refers to a fuel injection that is distributed or split between two fuel injectors. In this distributed injection region, the distribution ratio α is progressively reduced the higher the load on the engine. That is, the injection ratio of the in-cylinder fuel injection decreases and the injection ratio of the intake passage fuel injection increases. In the region other than the distributed injection region, i.e., in the low load region below the broken line in the drawing, the distribution ratio α is 1 (100%) so only an in-cylinder fuel injection is performed. The homogeneous lean burn region Z in the drawing can also be viewed as a distribution ratio map. In this case, a map in which the relationship between the engine speed and load ratio, and the distribution ratio α is fixed is stored in the ECU 100.

Figure 4:
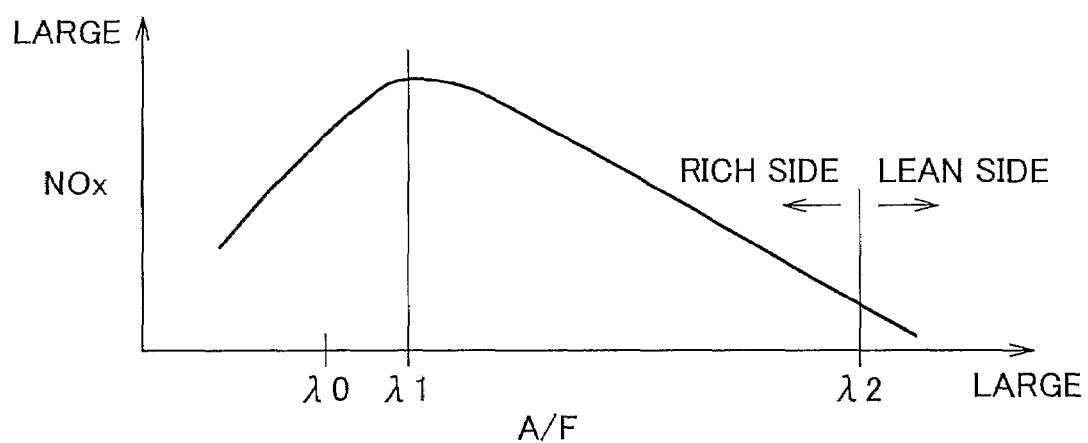
FIG. 4 is a line graph showing the relationship between the air-fuel ratio and the amount of NOx emitted.

FIG. 4 is a graph showing the relationship between the air-fuel ratio (A/F) and the amount of NOx emitted. As shown in the drawing, the amount of NOx emitted peaks at an air-fuel ratio λ1 that is somewhat larger than the stoichiometric air-fuel ratio λ0, and then decreases as the air-fuel ratio increases. In this example embodiment, when the engine is operating in the homogeneous lean burn region Z, the target air-fuel ratio in the air-fuel ratio control is an air-fuel ratio λ2 which is noticeably higher than the stoichiometric air-fuel ratio λ0 in an aim to drastically reduce NOx.

When the engine is operating in region Y other than the homogeneous lean burn region Z, the target air-fuel ratio is set to either the stoichiometric air-fuel ratio λ0 (i.e., stoichiometric control) or a value that is lower than the stoichiometric air-fuel ratio λ0 (i.e., rich control).

Because the target air-fuel ratio in the homogeneous lean burn region Z is this kind of high target air-fuel ratio λ2, the fuel injection quantity is less than it is during normal stoichiometric control or the like, and on the low load side in particular, it is close to the minimum fuel injection quantity of the fuel injector. If the actual air-fuel ratio becomes greater than the target air-fuel ratio λ2 in air-fuel ratio control, it means it is on the lean side so the fuel injection quantity is increase-corrected. Also, if the actual air-fuel ratio becomes less than the target air-fuel ratio λ2, it means it is on the rich side so the fuel injection quantity is decrease-corrected. In particular, compared with normal stoichiometric combustion, this kind of homogeneous lean burn causes the torque fluctuation to noticeably worsen when the air-fuel ratio is on the lean side, and has a considerable adverse effect on the amount of NOx emitted when the air-fuel ratio is rich.

Figure 5:
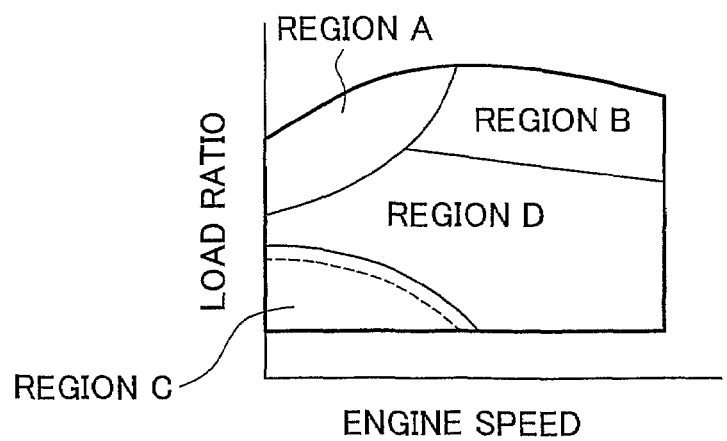
FIG. 5 is a graph showing each region A to D of the homogeneous lean burn region.

As shown in FIG. 5, in this example embodiment, the homogeneous lean burn region Z is farther divided into a plurality of regions A to D which are mapped. The mode of the increase-correction or decrease-correction of the fuel injection quantity switches between the regions A to D when air-fuel ratio control is performed.

Region A is a region on the low speed, high load side of the homogeneous lean burn region Z and requires homogeneity of the air-fuel mixture in the cylinder. That is, the fuel and air do not always mix well in the combustion chamber of the cylinder so it is necessary to promote that mixture in order to ensure homogeneity of the air-fuel mixture in the cylinder.

Therefore, during an increase-correction, the intake passage fuel injector 6 is made responsible for the larger part of the ratio of the increased fuel quantity and the in-cylinder fuel injector 11 is made responsible for the smaller part of the ratio. Also, during a decrease-correction, the in-cylinder fuel injector 11 is made responsible for the larger part of the ratio of the decreased fuel quantity and the intake passage fuel injector 6 is made responsible for the smaller part of the ratio.

This is because the injection timing of the intake passage fuel injection is earlier than the in-cylinder fuel injection during the intake stroke and is thus advantageous for homogenization.

In particular, in this example embodiment, the larger part of the ratio means 100% and the smaller part of the ratio means 0%. For example, during an increase correction, the total increase amount is injected from the intake passage fuel injector 6, and during a decrease-correction, the total decrease amount is subtracted from the injection quantity of the in-cylinder fuel injector 11. This injection distribution of 100% and 0% is only an example, however. Other methods of dividing the injection up are also possible.

The mode of this correction will now be described in detail. For example, during an increase-correction, i.e., when the actual air-fuel ratio is higher than the target air-fuel ratio λ2 and thus on the lean side, a fuel injection quantity of the increase amount ΔQ+ is obtained as shown below using Expression (1) above.

$$\Delta Q+ = Q0 \times K1 \times K2 - Q0 \times K1 \times 1 = Q0 \times K1 \times (K2-1) \quad (1)'$$

(but K2>1 here)

Here, the intake passage fuel injector 6 is responsible for the total increase amount ΔQ+ so the in-cylinder fuel injection quantity Qd and the intake passage fuel injection quantity Qp after the increase-correction are as follows.

$$Qd = \alpha \times Q0 \times K1 \times 1 \quad (2)'$$

$$Qp = (1-\alpha) \times Q0 \times K1 \times 1 + Q0 \times K1 \times (K2-1) \quad (3)'$$

When the mode of this correction is generalized using a predetermined load ratio β, we get the following. The load ratio β is a value within the range of 0.5<β≦1. The larger part of the ratio of the distributed injection is β and the smaller part of that ratio is (1−β). Expressions (2)' and (3)' above can be rewritten as follows.

$$Qd = \alpha \times Q0 \times K1 \times 1 + Q0 \times K1 \times (K2-1) \times (1-\beta) \quad (2)''$$

$$Qp = (1-\alpha) \times Q0 \times K1 \times 1 + Q0 \times K1 \times (K2-1) \times \beta \quad (3)''$$

In this example embodiment, β=1.

Similarly, during a decrease-correction, i.e., when the actual air-fuel ratio is less than the target air-fuel ratio λ2 and thus on the rich side, a fuel injection quantity of the decrease amount ΔQ− is obtained as follows using Expression (1) above.

$$\Delta Q- = Q0 \times K1 \times 1 - Q0 \times K1 \times K2 = Q0 \times K1 \times (1-K2) \quad (1)''$$

(but K2<1 here)

The in-cylinder fuel injector 11 is responsible for the larger part of the ratio of this decrease amount ΔQ− so Expressions (2)'' and (3)'' above can be rewritten as follows.

$$Qd = \alpha \times Q0 \times K1 \times 1 - Q0 \times K1 \times (1-K2) \times \beta \quad (2)'''$$

$$Qp = (1-\alpha) \times Q0 \times K1 \times 1 - Q0 \times K1 \times (1-K2) \times (1-\beta) \quad (3)'''$$

In this example embodiment, β=1 in Expressions (2)''' and (3)'''.

Next, region B shown in FIG. 5 is a region on the high speed, high load side of the homogeneous lean burn region Z and requires that an increase in the temperature of the tip of the in-cylinder fuel injector 11 be suppressed. That is, in this region, the temperature in the cylinder becomes relatively high, and as it does so, the temperature of the tip of the in-cylinder fuel injector 11 also rises. This may cause problems such as deposits adhering to the tip of the fuel injector so it is necessary to suppress an increase in temperature of the tip of the fuel injector to ensure at least a constant in-cylinder fuel injection quantity. Therefore, during an increase-correction the in-cylinder fuel injector 11 is responsible for the larger part of the ratio of the increase quantity (i.e., 100% in this example embodiment), and during a decrease-correction the intake passage fuel injector 6 is responsible for the larger part of the ratio of the decrease quantity (i.e., 100% in this example embodiment). This prevents the temperature of the tip of the in-cylinder fuel injector 11 from rising excessively. The in-cylinder fuel injection quantity Qd and the intake passage fuel injection quantity Qp after the increase-correction and after the decrease-correction are obtained by the same method.

Region C is a region on the low load side of the homogeneous lean burn region Z. In particular, most of that region (i.e., below the broken line) has a distribution ratio of $\alpha=1$ (100%). In this region a distributed injection is not performed. Here, the reason for making the distribution ratio $\alpha=1$ is because the total quantity of the fuel injection quantity is originally small so if it were divided, then the fuel injection quantity per one fuel injector would be extremely small, possibly below the minimum fuel injection quantity, which may result in a large air-fuel ratio deviation or fuel unable to be injected. Also, the reason for having the total amount be injected with the in-cylinder fuel injection and not the intake passage fuel injection is because if the in-cylinder fuel injection were stopped, the temperature of the tip of the in-cylinder fuel injector 11 may rise, which is problematic as described above. In most of region C, only an in-cylinder fuel injection is performed. Therefore, the fuel injection quantity of the entire region C is corrected only with the in-cylinder fuel injection. That is, during an increase-correction, fuel of the increase amount is injected from the in-cylinder fuel injector 11. During a decrease-correction, fuel of the decrease amount is subtracted from the injection quantity of the in-cylinder fuel injector 11. In this way, in the region where a fuel injection is originally performed only from one of the fuel injectors, fuel will not suddenly be injected from the other fuel injector during a correction.

Region D is a region on the medium load side of the homogeneous lean burn region Z. In this region, the correction of the fuel injection quantity is not restricted as it is in region C. Rather, in this region the increase-correction or decrease-correction of the fuel injection quantity may also be executed using either the in-cylinder fuel injector 11 or the intake passage fuel injector 6. In this example embodiment, the increase-correction or decrease-correction of the fuel injection quantity is executed using both of the fuel injectors.

Figure 6A:
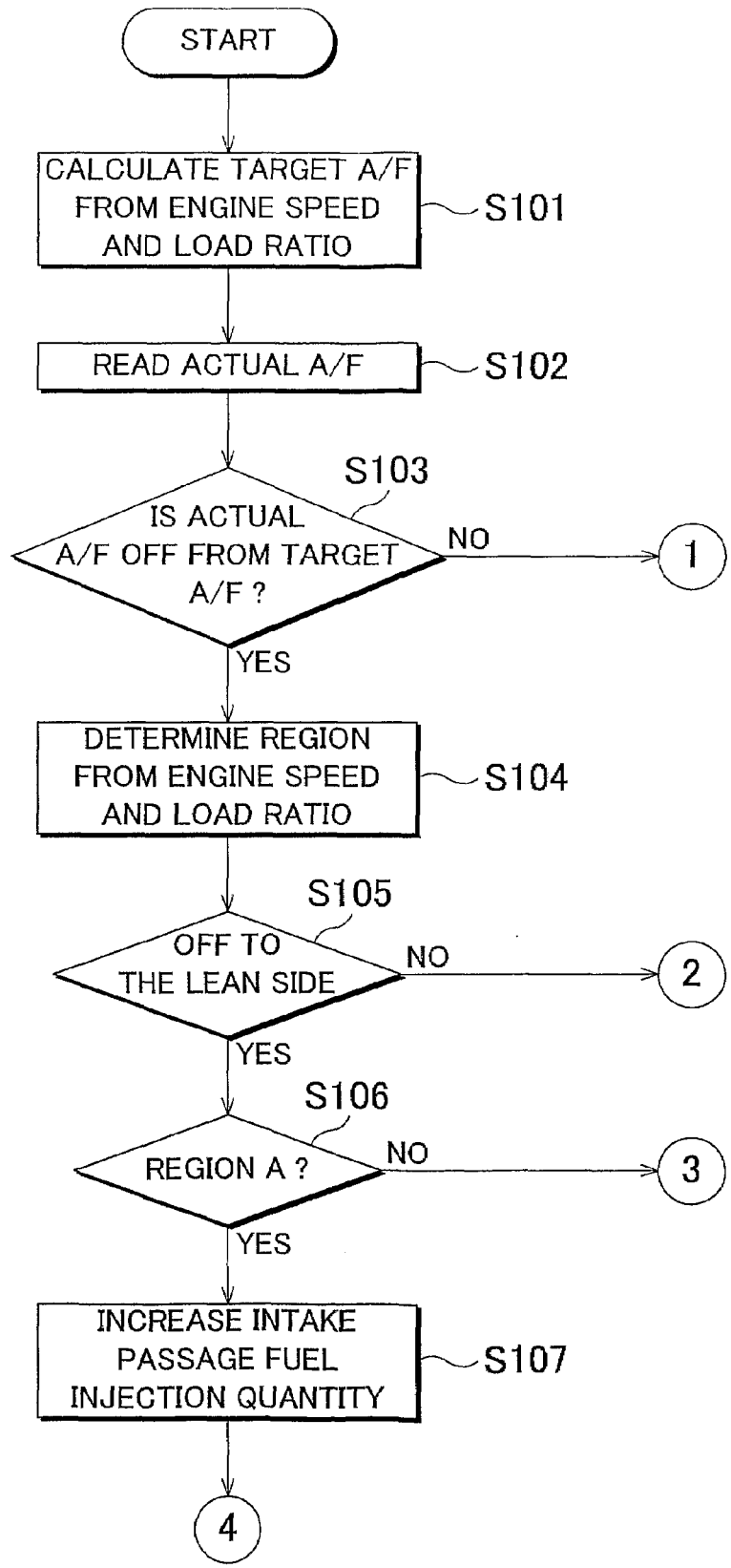
FIGS. 6A and 6B are a flowchart illustrating an air-fuel ratio control routine.
Figure 6B:
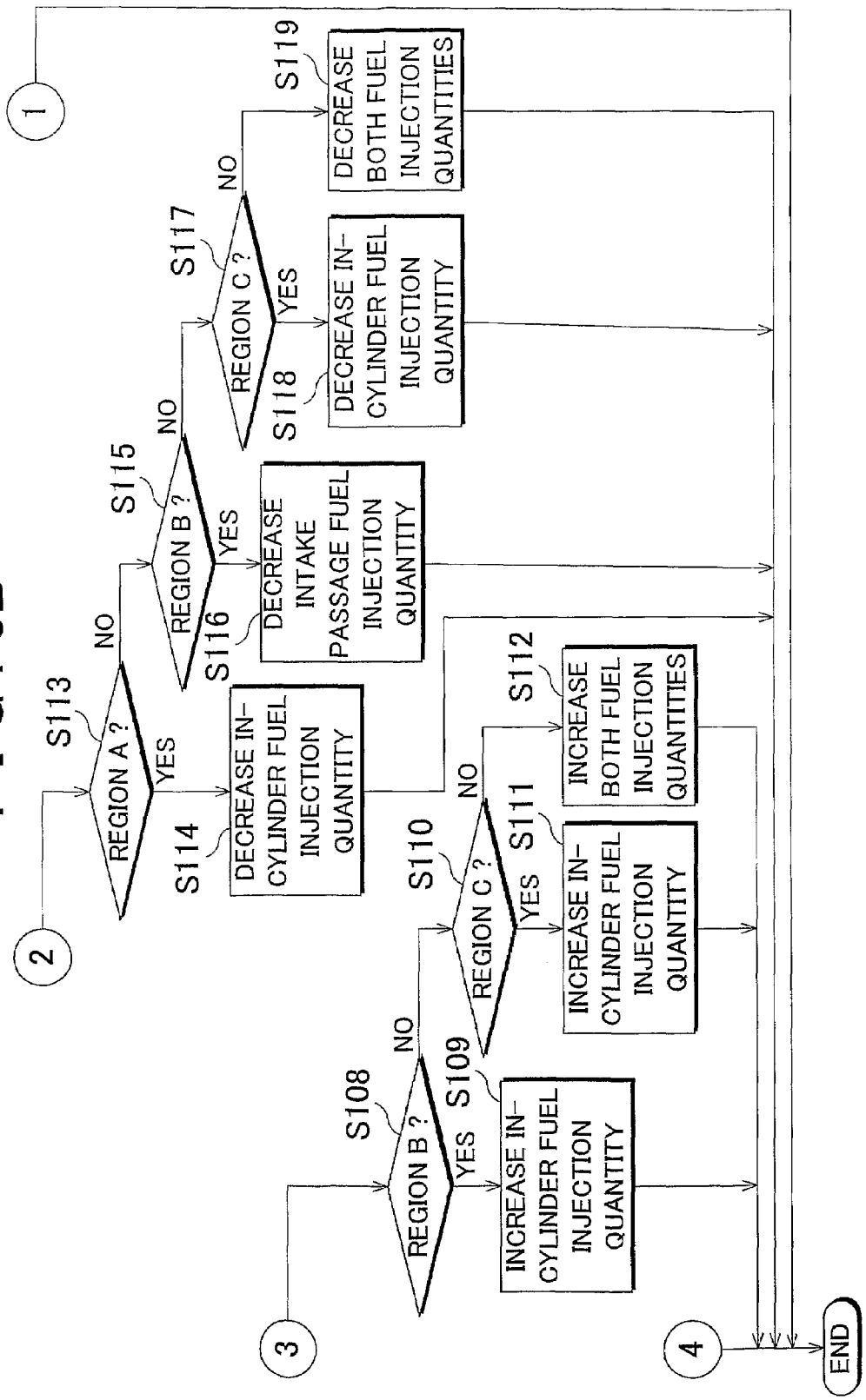

The specific details of the air-fuel ratio control will now be described with reference to the flowchart in FIGS. 6A and 6B. The routine shown in the drawing is executed at each fuel injection cycle in each cylinder by the ECU 100. Also, the routine in the drawing is executed when the engine is operating in the homogeneous lean burn region Z. Hereinafter, the word "step" will be abbreviated with the letter "S".

First, the ECU 100 calculates a target air-fuel ratio (i.e., target A/F) from the detected engine speed and load ratio (S101). A map of the target air-fuel ratio in the homogeneous lean burn region Z is stored in the ECU 100. The ECU 100 calculates the target air-fuel ratio corresponding to the detected engine speed and load ratio referencing this map. The target air-fuel ratio is a value $\lambda 2$ which is noticeably higher than the stoichiometric air-fuel ratio, as described above.

Next, the ECU 100 reads the value of the actual air-fuel ratio (i.e., actual A/F) detected by the air-fuel ratio sensor 30 of the cylinder that is to be controlled (S102). The ECU 100 then compares this actual air-fuel ratio with the calculated target air-fuel ratio and determines whether the actual air-fuel ratio is off by equal to or more than a predetermined value from the target air-fuel ratio (S103). This predetermined value is a value around 0.2 to 0.3, for example. If it is determined that the actual air-fuel ratio is not off, then this cycle of the routine ends. If, on the other hand, it is determined that the actual air-fuel ratio is off, then the region, from among regions A to D, that the detected engine speed and load ratio (i.e., the current operating state of the engine) are in is determined referencing the map in FIG. 5 (S104).

Next, the ECU 100 determines whether the air-fuel ratio is on the lean side of the target air-fuel ratio (S105). If it is determined that the air-fuel ratio is on the lean side, then it is next determined whether the engine is currently operating in region A (S106). If it is determined that the engine is currently operating in region A, then the ECU 100 increases the fuel injection quantity of the intake passage fuel injection by a predetermined amount to bring the air-fuel ratio back from the lean side (S107). If it is determined that the engine is not currently operating in region A, then it is determined whether the engine is currently operating in region B (S108). If it is determined that the engine is currently operating in region B, then the ECU 100 increases the fuel injection quantity of the in-cylinder fuel injection by a predetermined amount to bring the air-fuel ratio back from the lean side (S109). If it is determined that the engine is not currently operating in region B, then it is determined whether the engine is operating in region C (S110). If it is determined that the engine is operating in region C, then the ECU 100 increases the fuel injection quantity of the in-cylinder fuel injection by a predetermined amount to bring the air-fuel ratio back from the lean side (S111). If it is determined that the engine is not currently operating in region C (i.e., if it is determined that engine is operating in region D), then the ECU 100 increases the fuel injection quantities of both the intake passage fuel injection and the in-cylinder fuel injection by a predetermined amount each to bring the air-fuel ratio back from the lean side (S112). In this case, at what ratio the total increase amount is to be divided between the fuel injectors is arbitrary. For example, the increase amounts of both fuel injection quantities may be set equal.

If, on the other hand, it is determined in step S105 that the air-fuel ratio is not off to the lean side, i.e., if it is determined that the air-fuel ratio is off to the rich side, then the ECU 100 determines whether the engine is currently operating in region A (S113). If it is determined that the engine is operating in region A, then the ECU 100 decreases the fuel injection quantity of the in-cylinder fuel injection by a predetermined amount to bring the air-fuel ratio back from the rich side (S114). If it is determined that the engine is not currently operating in region A, then it is next determined whether the engine is operating in region B (S115). If it is determined that the engine is operating in region B, then the ECU 100 decreases the fuel injection quantity of the intake passage fuel injection by a predetermined amount to bring the air-fuel ratio back from the rich side (S116). If it is determined that the engine is not currently operating in region B, then it is next determined whether the engine is operating in region C (S117). If it is determined that the engine is operating in region C, then the ECU 100 decreases the fuel injection quantity of the in-cylinder fuel injection by a predetermined amount to bring the air-fuel ratio back from the rich side (S118). If it is determined that the engine is not currently operating in region C (i.e., if it is determined that the engine is operating in region D), then the ECU 100 decreases the fuel injection quantities of both the intake passage fuel injection and the in-cylinder fuel injection by a predetermined amount each to bring the air-fuel ratio back from the rich side (S119).

Similarly, in this case as well, at what ratio the total decrease amount is to be divided between the fuel injectors is arbitrary. For example, the decrease amounts of both fuel injection quantities may be set equal.

Next, the correction coefficient K1 relating to the individual differences and the like of the injectors will be described. Essentially there are variations or individual differences caused by manufacturing error in each fuel injector, which cause subtle variations in the fuel injection quantities even when the injectors are turned on at the same time. Moreover, this variation in the fuel injection quantity tends to increase the smaller the fuel injection quantity, and more particularly, the closer the fuel injection quantity gets to the minimum fuel injection quantity of the injector. As described above, with homogeneous lean burn executed in this example embodiment, the fuel injection quantity is smaller than it is with stoichiometric combustion, and on the low load side, the fuel injection quantity is even smaller. In this case, if a distributed injection is performed, the fuel injection quantities of the injectors become even smaller. As a result, the variation in injection quantities and air-fuel ratio deviation among cylinders in this example embodiment tend to increase. Moreover, with air-fuel ratio control for lean burn in which the target air-fuel ratio is set higher than normal, air-fuel ratio deviation adversely effects NOx deterioration and torque fluctuation so only a small degree of deviation in the air-fuel ratio can be allowed. Accordingly, air-fuel ratio deviation among cylinders or fuel injectors must be suppressed more than normal and the air-fuel ratio accuracy of each injector increased. Variation in the airflow due to differences in the lengths of the intake paths between cylinders, for example, can also cause deviation in the air-fuel ratios among cylinders.

In view of these concerns, the correction coefficient K1 is a correction parameter employed to suppress this deviation in air-fuel ratios between cylinders. In this example embodiment, an appropriate correction coefficient K1 is learned and set for each fuel injector, and the value of the correction coefficient K1 is set so that a desired air-fuel ratio is always obtained according to a control signal sent to each fuel injector.

Hereinafter, the learning and setting of this kind of correction coefficient K1 will be described. FIGS. 7 and 8 show relationships between the fuel injection quantity and the correction coefficient K1. FIG. 7 shows a case where the fuel injection quantity with respect to a signal sent to the fuel injector is less than was planned, i.e., a case where the air-fuel ratio deviates to the lean side. Conversely, FIG. 8 shows a case where the fuel injection quantity with respect to a signal that was sent to the fuel injector is more than was planned, i.e., a case where the air-fuel ratio deviates to the rich side. These relationships are symmetrical with respect to the axis of the correction coefficient K1=1. The following description will focus around the case shown in FIG. 7 where there is a deviation to the lean side.

In FIG. 7, the broken line represents a change in the correction coefficient K1 with respect to the fuel injection quantity when the actual air-fuel ratio that was detected always matches the target air-fuel ratio. As shown in the drawing, the correction coefficient K1 is larger such that the fuel of the increase-correction amount increases the smaller the fuel injection quantity (i.e., farther toward the low load side). In particular, near the idling fuel injection quantity Qi, the deviation of the fuel injection quantity with respect to the signal sent to the fuel injector is noticeably large so the value of the correction coefficient is also large. Conversely, when the fuel injection quantity is large, the deviation of the fuel injection quantity is less such that on the high load side the correction coefficient K1 is regarded as almost 1.

The method for determining the correction coefficient K1 in this example embodiment using this kind of characteristic will be described below with reference to FIG. 7. First, the engine operating range is divided into a plurality of regions, e.g., an idling region, a low load region, a medium load region, and a high load region, which are stored in the ECU 100. The idling region is a region that is equal to or less than Q1 which is slightly higher than the idling fuel injection quantity Qi. The low, medium, and high regions correspond to regions that are created when the region in which the fuel injection quantity becomes greater than Q1 and equal to or less than a value Q4 during maximum load is divided into three. The region in which the fuel injection quantity Q is Q1<Q≦Q2 is the low load region. The region in which the fuel injection quantity Q is Q2<Q≦Q3 is the medium load region. The region in which the fuel injection quantity Q is Q3<Q is the high load region. The correction coefficient K1$hp$ of the high load region is set beforehand to 1 and stored in the ECU 100.

First, the setting of the correction coefficient K1 for the intake passage fuel injector 6 of each cylinder will be described. The ECU 100 switches the fuel injection to only the intake passage fuel injection regardless of the map in FIG. 3 at a predetermined timing after the engine has finished warming up and is operating steadily on the low load side (i.e., when the engine is idling in this example embodiment). Then the ECU 100 changes the fuel injection quantity of each cylinder by changing the correction coefficient K1 in each cylinder so that the actual air-fuel ratio in each cylinder matches a respective predetermined target air-fuel ratio. The ECU 100 also learns the correction coefficient K1$ip$ for each cylinder obtained at this time and stores them as correction coefficients of the idling region for the intake passage fuel injector 6 of each cylinder.

Next, the ECU 100 interpolates the correction coefficients for the low load region and the medium load region based on the correction coefficient K1$ip$ of the idling region and the correction coefficient K1$hp$ (=1) of the high load region. The method of interpolation is arbitrary, but in this example embodiment, the correction coefficient K1$lp$ of the low load region and the correction coefficient K1$mp$ of the medium load region are calculated as follows.

$$K1lp = 1 + ((K1ip - 1)/n) \quad (4)$$

$$K1mp = 1 + ((K1ip - 1)/2n) \quad (5)$$

Here, n is an interpolation constant and is a whole number equal to or greater than 2, and more preferably, a whole number around 4 to 8, inclusive.

The ECU 100 then stores the calculated correction coefficients K1$lp$ and K1$mp$. Thus, the ECU 100 sets and stores all of the correction coefficients K1 from the idling region to the high load region. The correction coefficients K1 for each region are as shown in FIG. 9. These correction coefficients K1 are used in the fuel injection control thereafter. For example, when an intake passage fuel injection is performed in the low load region, K1$lp$ is used as the correction coefficient K1 for that. The correction coefficient K1 is updated (with the exception of the high load region) at a predetermined update timing each time the engine is started or each time the ECU 100 is initialized, for example. This makes it possible to respond to degradation and the like of the fuel injectors over time.

The case described above is one in which the air-fuel ratio is off to the lean side, though the correction coefficient K1 of each region is set according to a similar procedure for a case in which the air-fuel ratio is off to the rich side, as shown in FIG. 8. Expressions (4) and (5) above are also used for interpolation.

According to the structure described above, an optimum correction coefficient K1 so that the air-fuel ratio will not deviate from the target air-fuel ratio can be set for all of the intake passage fuel injectors 6 and all operating regions. As a result, it is possible to suppress variations in the air-fuel ratios or fuel injection quantities among cylinders or fuel injectors, and thus increase the accuracy of air-fuel ratio control. In particular, air-fuel ratio control can be preferably executed in the homogeneous lean burn region.

Also, the fact that learning is only performed on the low load side (in the idling region in this example embodiment) enables it to be much simpler and the learning time drastically shortened compared to when learning is performed for the all of load regions or fuel injection quantities.

Next the setting of the correction coefficient K1 with respect to the in-cylinder fuel injector 11 of each cylinder will be described. In the case of an in-cylinder fuel injection, the fuel pressure is controlled according to the engine operating state. In this case, the fuel pressure therefore also causes variation in the air-fuel ratios and fuel injection quantities. Therefore, in this example embodiment, the ECU 100 sets and stores the correction coefficient K1 of each region for each of a plurality of fuel pressures. Then during fuel injection control thereafter, the correction coefficient K1 to be used for the in-cylinder fuel injection is determined through interpolation with respect to the fuel pressure.

FIG. 10 is a map for calculating the correction coefficient K1 and shows the value of the correction coefficient K1 for each fuel pressure. Here, P1, P2, P3, and P4 are predetermined fuel pressures, with P1 being a value for extremely low pressure, P2 being a value for low pressure, P3 being a value for medium pressure, and P4 being a value for high pressure. The ECU 100 first fixes the fuel pressure at P1 when setting or updating the correction coefficient K1 that is performed at the update timing. By a method similar to that described above (i.e., the correction coefficients K1 of the idling region are learned, the correction coefficients K1 of the low and medium load regions are calculated, and the correction coefficients K1 of the high load region are set to 1, as described above), the ECU sets and stores the correction coefficients K1$id$1, K1$ld$1, K1$md$1 of the idling region, the low load region, and the medium load region, respectively, in this state. Next, the ECU 100 fixes the fuel pressure at P2 and sets and stores the correction coefficients K1$id$2, K1$ld$2, K1$md$2 of the idling region, the low load region, and the medium load region, respectively, by a similar method in this state. The ECU 100 then executes similar operations with the fuel pressures P3 and P4, thereby obtaining the map shown in FIG. 10.

In the fuel injection control thereafter, when in-cylinder fuel injection is performed, the ECU 100 determines the region corresponding to the detected engine speed and load ratio, and reads the detected fuel pressure. The ECU 100 then obtains the correction coefficient K1 that corresponds to the fuel pressure by interpolation. For example, when the engine is operating in the idling region and the detected fuel pressure P is a value right between P1 and P2, the ECU 100 sets the quotient of the sum of K1$id$1 and K1$id$2 divided by 2 as the correction coefficient K1.

Accordingly, variation in the air-fuel ratios of the in-cylinder injection can be appropriately suppressed because the correction coefficient K1 is determined also taking the fuel pressure into account.

In this example embodiment, the operating range of the engine is divided into a plurality of load regions and the same value of the correction coefficient K1 is used in each load region. Alternatively, however, a plurality of lattice points may be provided for the fuel injection quantities as well, similar to the fuel pressures of the in-cylinder fuel injection in this example embodiment, and a correction coefficient between fuel injection quantity lattice points may be interpolated during actual fuel injection control. This interpolation can be applied to either an intake passage fuel injection or an in-cylinder fuel injection.

Next, another mode relating to the learning and setting of the correction coefficient K1 of the in-cylinder fuel injection will be described.

As shown in FIG. 10, in this example embodiment, only the correction coefficient K1 of the idling region is learned for each fuel pressure P1 to P4, and, with the exception of the high load region, the correction coefficient K1 is calculated by interpolation in the remaining low load and medium load regions. In contrast, as shown in FIG. 11, learning may be performed in the low load and medium load regions for each fuel pressure P1 to P4. Accordingly, although the total learning time increases, accurate correction coefficients are able to be obtained over a wide range, thereby further improving the accuracy of air-fuel ratio control.

With the mode shown in FIG. 12, the correction coefficient of the idling region for the extremely low fuel pressure P1, the correction coefficient of the low load region for the low fuel pressure P2, and the correction coefficient of the medium load region for the medium fuel pressure P3 are learned (i.e., learning is diagonal in the drawing), and the remaining correction coefficients, with the exception of those of the high load region, are interpolated. Accordingly, learning in the idling region is not uniform. Rather, learning is performed with fuel pressures that will likely be repeatedly used in each load region so it is likely that this will be more practical.

With the mode shown in FIG. 13, only the correction coefficient of the idling region for the extremely low fuel pressure P1 is a learned value. The remaining correction coefficients, with the exception of those of the high load region, are interpolated. This is the simplest method and the learning time is drastically reduced.

As can be understood by the foregoing description, in this example embodiment the ECU 100 serves as correcting means, switching means, and learning means.

Although an example embodiment of the invention has been described, the invention is not limited to that example embodiment, i.e., various other example embodiments can also be employed. For example, in the foregoing example embodiment, the fuel injector that performs the increase-correction and decrease-correction is switched within the homogeneous lean burn region. Alternatively, however, this switching can also be performed in a region other than the homogeneous lean burn region.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An engine control apparatus comprising:
   an intake passage fuel injector for executing an intake passage fuel injection;
   an in-cylinder fuel injector for executing an in-cylinder fuel injection;
   a correcting portion that corrects a fuel injection quantity to bring an air-fuel ratio close to a predetermined target air-fuel ratio by selectively executing an increase-correction of the fuel injection quantity when the air-fuel ratio is on the lean side and a decrease-correction of the fuel injection quantity when the air-fuel ratio is on the rich side; and
   a switching portion that divides the fuel injection quantity according to a distribution ratio between the two fuel injectors, makes one of the fuel injectors responsible for the larger part of the ratio and the other fuel injector for the smaller part of the ratio, and switches the fuel injector responsible for the larger part of the ratio according to the operating state of the engine when executing one of the increase-correction and the decrease-correction by the correcting portion,
   wherein the switching portion switches the fuel injector when the engine is operating in a predetermined distributed injection region, and
   wherein when the engine is operating in a state in which homogeneity of an air-fuel mixture in a cylinder is required, the switching portion makes the intake passage fuel injector the injector responsible for the larger part of the ratio during the increase-correction and makes the in-cylinder fuel injector the injector responsible for the larger part of the ratio during the decrease-correction.

2. The control apparatus according to claim 1, wherein when the engine is operating in a state in which a rise in temperature of a tip of the in-cylinder fuel injector needs to be suppressed, the switching portion makes the in-cylinder fuel injector the injector responsible for the larger part of the ratio during the increase-correction and makes the intake passage fuel injector the injector responsible for the larger part of the ratio during the decrease-correction.

3. An engine control apparatus comprising:
   an intake passage fuel injector for executing an intake passage fuel injection;
   an in-cylinder fuel injector for executing an in-cylinder fuel injection; and
   a learning portion which changes the fuel injection quantity of the intake passage fuel injector or the in-cylinder fuel injector of each cylinder such that the air-fuel ratio of each cylinder matches a predetermined target air-fuel ratio during steady operation on a low load side of the engine, and learns a correction coefficient for each cylinder when the air-fuel ratio matches the predetermined target air-fuel ratio during the steady operation on the low load side of the engine.

4. The control apparatus of an engine according to claim 3, wherein the learning portion learns the correction coefficients when the engine is idling, sets a learned value of the correction coefficient for each cylinder that was obtained through that learning as the correction coefficient of an idling region, and interpolates the correction coefficient of a load region between the idling region and a high load region based on the correction coefficient of the idling region and a predetermined correction coefficient of the high load region.

5. The control apparatus of an engine according to claim 4, wherein when learning the correction coefficients for the in-cylinder fuel injector, the learning portion learns those correction coefficients for each of a plurality of fuel pressures.

6. The control apparatus of an engine according to claim 3, wherein when learning the correction coefficients for the in-cylinder fuel injector, the learning portion learns those correction coefficients for each of a plurality of fuel pressures.

* * * * *